W. G. DUNN.
ENGINE SHAFT COUNTERBALANCE.
APPLICATION FILED JUNE 21, 1917.
1,248,832.
Patented Dec. 4, 1917.
2 SHEETS—SHEET 1.
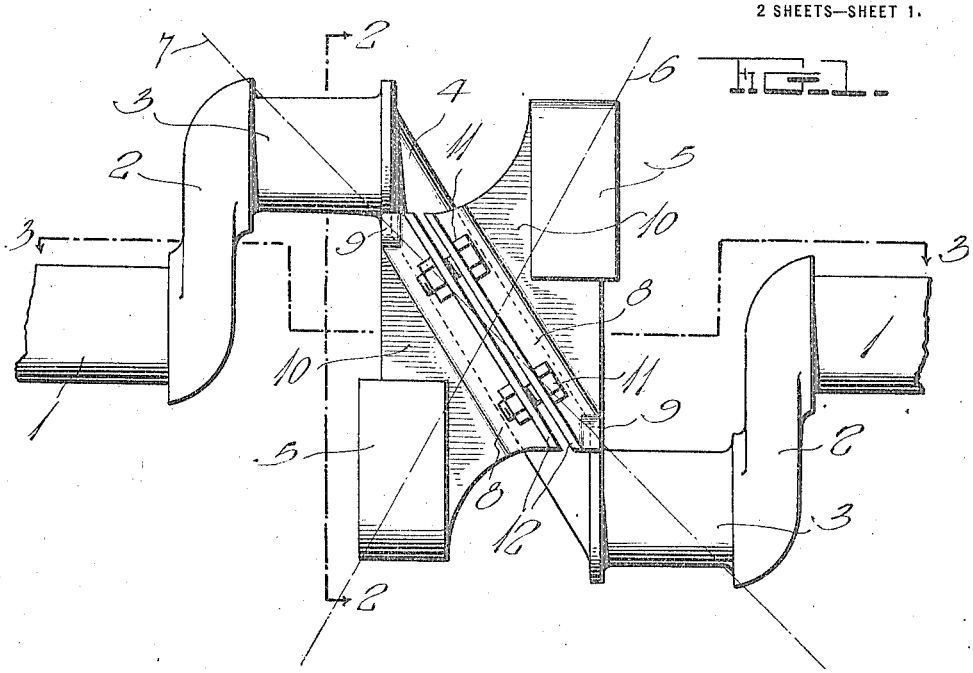
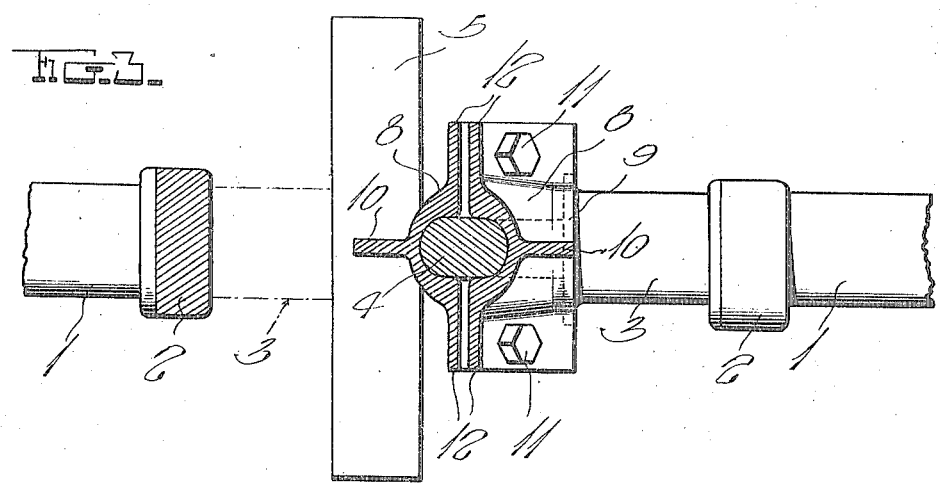
Witness
H. Woodard
Inventor
W. G. Dunn
By H. B. Wilson & Co.
Attorneys

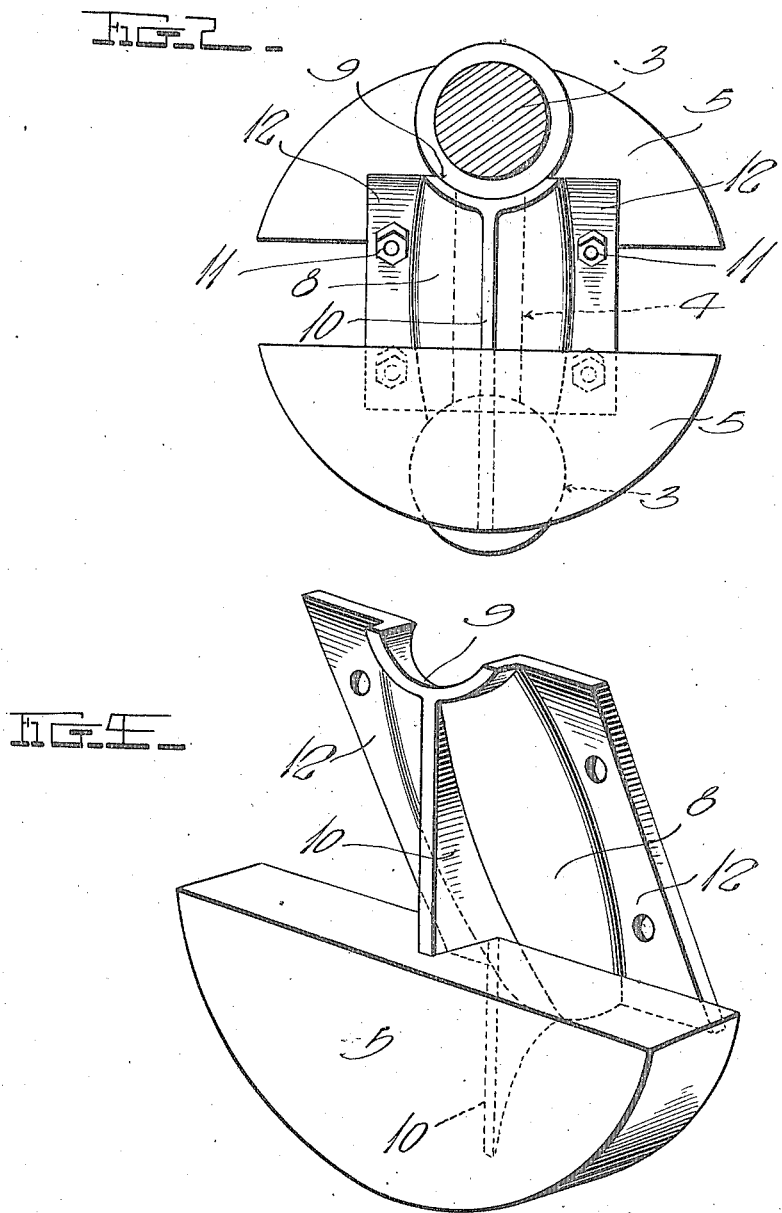

UNITED STATES PATENT OFFICE.

WILLIAM G. DUNN, OF CLARINDA, IOWA.

ENGINE-SHAFT COUNTERBALANCE.

1,248,832.  Specification of Letters Patent.  Patented Dec. 4, 1917.

Application filed June 21, 1917. Serial No. 176,145.

*To all whom it may concern:*

Be it known that I, WILLIAM G. DUNN, a citizen of the United States, residing at Clarinda, in the county of Page and State of Iowa, have invented certain new and useful Improvements in Engine-Shaft Counterbalances; and I do declare the following to be a full, clear, and exact description of the invention, such as will enable others skilled in the art to which it appertains to make and use the same.

My invention relates broadly to improvement in the crank shafts of numerous types of engines, and more particularly to a counter balancing device for preventing distortion of the shaft by the action of centrifugal force on the several cranks thereof.

Experiment and observation have taught that engine crank shafts having opposed cranks positioned on a line extending obliquely across the shaft, are prone to become deflected when the engine is running at a high rate of speed, this being due to the fact that the crank pins seek a common plane of rotation. This action of the pins, must be resisted by the several bearings, with the result that excessive strain is placed upon the latter so that they are short lived. To overcome this and other disadvantages such as vibration, one object of my invention is to position a pair of counter balances adjacent the opposite sides of the shaft and on an oblique line crossing the aforesaid line on which the crank pins are located, said counter balances exerting the same tendency as said cranks to seek a common rotative plane. By this means, the shaft is so balanced that it practically floats in its bearings.

Another object of the invention is to provide an arrangement of counter balances which are so constructed as to permit easy attachment thereof to engine shafts of the usual construction.

A further object is to so manufacture the counter balances as to render the same interchangeable, thus effecting a great saving in the manufacture and installation of the devices.

A still further object of the invention is to provide a system of counter balances which is readily adaptable to crank shafts in which the opposed crank pins are connected by an oblique portion or crank arm.

With the foregoing general objects in view the invention resides in the novel features of construction and unique combinations of parts to be hereinafter fully described and claimed, the descriptive matter being supplemented by the accompanying drawings which form a part of this specification and in which:

Figure 1 is a side elevation of a portion of a crank shaft showing the application of my invention;

Fig. 2 is a vertical transverse section on the plane of the line 2—2 of Fig. 1;

Fig. 3 is a horizontal section on the plane indicated by the line 3—3 of Fig. 1; and Fig. 4 is a perspective view of one of the counter balances and its attaching means.

In the drawings above briefly described, a common type of crank shaft 1 is shown, said shaft including a pair of crank arms 2, opposed crank pins 3 carried partially by the ends of said arms, and one or more oblique portions or crank arms 4 which extend between the pins 3 and assist the arms 2 in carrying the same. Since the two pins 3 must be spaced longitudinally on the shaft, said pins seek a common plane of rotation, when the shaft is rotating at a high rate of speed, this being due to the fact that centrifugal force is exerted upon said pins and it tends to throw them outwardly. Due to the fact that the pins 3 are connected by the oblique arm 4, however, the outward force exerted on said pins, is not truly radial, but a combination between radial and longitudinal, it being not only the weight of the arms 2 and pins 3 that tends to so move them, but also the weight of the crank arm 4, all of these parts simultaneously seeking a single plane of rotation.

In order to resist the action above described, I employ a pair of counter balancing weights 5 which are positioned on opposite sides of the shaft axis and located on a line 6 which crosses the oblique line 7 upon which the crank pins 3 are located, the weight of the counter balances being such as to exert the same tendency as the cranks, to seek a common rotative plane. The force acting on the weights 5, however, is opposed to that exerted on the crank pins 3 and the associated parts, with the result that no deflection of the shaft will take place as the same is rapidly rotated, said shaft being truly balanced so that it practically floats in its bearings without causing undue wear and thrust thereon.

Any preferred means could well be employed for securing the weights 5 in place, but said weights are by preference equipped with channel members 8 adapted for application to the opposite sides of the crank arm 4 as shown clearly in the drawings, one end of each of said channel members being formed with an arcuate seat 9 for engagement with the circular end portions of the crank arm 4, adjacent the pins 3. The channel members 8 are shown joined integrally to the weights 5, by means of suitable webs 10, but it is to be understood that both parts could well be secured together in any other preferred manner. In all cases, however, it is preferable to provide the channel members 8 with outstanding longitudinal flanges 12 through which bolts or cap screws 11 extend for drawing said channel members together into contact with opposite sides of the arm 4 or equivalent part of the crank shaft to which the device may be applied.

When the improved counter balances are to be applied to crank shafts on which the opposed crank pins are connected by oblique crank arms such as that indicated at 4 the channel members 8 will necessarily be disposed in planes at acute angles to those in which the weights 5 are located, but when the invention is to be used upon crank shafts in which the adjacent opposed crank pins are connected by an arm positioned otherwise than obliquely, the relation of the channel members and weights must necessarily vary. Said minor changes, however, lie clearly within the scope of the invention.

From the foregoing, taken in connection with the accompanying drawings, it will be obvious that although my invention is of extremely simple and inexpensive nature, it will be highly efficient for the purposes intended and will be applicable to numerous types of crank shafts now in use, without the necessity of altering the construction thereof in any manner whatsoever. Furthermore, it is unnecessary to drill any openings in the cranks or crank pins when securing the counter-balances in place. This is rendered unnecessary by the provision of the clamps which are formed of the opposed channel members 8, said clamps serving not only to secure the counter balances in place without altering the crank shaft construction, but simultaneously acting to reinforce the portions of the shaft around which they are secured. On account of these advantages, the use of clamps of the construction shown, or of similar formation, is deemed a highly important feature of the invention.

In the drawings I have shown the preferred features of construction for carrying out the objects of the invention in an expeditious manner, but numerous minor changes may be made within the scope of the invention as claimed, without sacrificing the principal advantages.

I claim:

1. An engine crank shaft having an oblique crank arm extending to opposite sides of the shaft axis and opposed crank pins on the ends of said arm, a pair of opposed unjoined counter balances disposed on an oblique line crossing said crank arm, said counter balances being spaced longitudinally of the shaft from the inner ends of said crank pins and from the ends of said crank arm, and means for securing said counter balances to said crank arm and at the same time for strengthening said arm.

2. An engine crank shaft having an oblique crank arm extending to opposite sides of the shaft axis and opposed crank pins on the ends of said arm, a pair of opposed unjoined counter balances disposed on an oblique line crossing said crank arm, said counter balances being spaced longitudinally of the shaft from the inner ends of said crank pins and from the ends of said crank arm, a pair of channel members carrying said counter-balances rigidly and applied to opposite sides of said crank arm, said channel members extending substantially throughout the length of said crank arm to strengthen the same, and means for drawing said channel members tightly around said arm.

3. A structure as specified in claim 2, the inner ends of said crank pins having outstanding rigid collars and said channel members having U-shaped seats at one end in which the inner portions of said collars are snugly received.

4. A crank shaft counter balance comprising a weight, a channel member carried thereby and of a length to receive substantially the full length of a transverse arm of the shaft, and means for securing said channel member and arm in fixed relation.

5. A crank shaft counter balance comprising a weight, a channel member carried thereby and of a length to receive substantially the full length of a transverse arm of the shaft, a second channel member of equal length for application to the side of the arm remote from the first named channel member, and means for drawing the two members together around said arm.

6. A crank shaft counter balance comprising a pair of channel members for application to opposite sides of a transverse arm of the shaft and of a length to receive substantially the full length of said arms, means for drawing said members together around said arm, and counterbalancing weights carried by said members.

7. A structure as specified in claim 6, one end of each channel member having a U-shaped seat for engagement with collars at the ends of the crank pins of said arm.

8. A crank shaft counter balance comprising a pair of unjoined counter balances adapted to be positioned on opposite sides of the shaft axis, said counter balances being disposed in parallel planes spaced longitudinally of the shaft, a pair of separate channel members extending obliquely between said counter balances and joined integrally thereto, said members being of a length to extend substantially throughout the length of an oblique crank arm of the shaft when applied to opposite sides of said arm, screw threaded means for drawing said channel members together around said arm, and a U-shaped seat on one end of each channel member to engage the collars of the crank pins at the ends of said arm.

In testimony whereof I have hereunto set my hand in the presence of two subscribing witnesses.

WILLIAM G. DUNN.

Witnesses:
   GEO. C. ROBINSON,
   R. E. SEIFERT.